United States Patent
Lung

(10) Patent No.: US 12,187,000 B2
(45) Date of Patent: Jan. 7, 2025

(54) METHOD OF ASSEMBLING SPOKES INTO A NON-PNEUMATIC TIRE

(71) Applicant: Compagnie Generale des Etablissements Michelin, Clermont-Ferrand (FR)

(72) Inventor: David C. Lung, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 261 days.

(21) Appl. No.: 17/774,180

(22) PCT Filed: Nov. 27, 2019

(86) PCT No.: PCT/US2019/063556
§ 371 (c)(1),
(2) Date: May 4, 2022

(87) PCT Pub. No.: WO2021/107945
PCT Pub. Date: Jun. 3, 2021

(65) Prior Publication Data
US 2022/0363024 A1 Nov. 17, 2022

(51) Int. Cl.
*B29D 30/02* (2006.01)
*B60C 7/08* (2006.01)
*B60C 7/14* (2006.01)

(52) U.S. Cl.
CPC .............. *B29D 30/02* (2013.01); *B60C 7/146* (2021.08); *B60C 7/08* (2013.01)

(58) Field of Classification Search
CPC ............ B60C 7/08; B60C 7/146; B60B 31/04
See application file for complete search history.

(56) References Cited

U.S. PATENT DOCUMENTS

2004/0026028 A1\* 2/2004 Kirsten ...................... C09J 5/06
156/499
2005/0178507 A1\* 8/2005 Hajny .................. B65H 37/007
156/538

(Continued)

FOREIGN PATENT DOCUMENTS

IT 201900020436 \* 11/2019
WO 20190103728 A1 5/2019

OTHER PUBLICATIONS

Caldwell, David, Wear in Injection Molds: To Float or Not to Float, Mar. 1, 2008, MoldMaking Technology, <https://www.moldmakingtechnology.com/articles/wear-in-injection-molds-to-float-or-not-to-float>. (Year: 2008).\*

(Continued)

*Primary Examiner* — Katelyn W Smith
*Assistant Examiner* — Alexander D Booth
(74) *Attorney, Agent, or Firm* — Neal P. Pierotti

(57) ABSTRACT

A method of assembling spokes into a non-pneumatic tire (10) is provided in which a shear band (16) is located outward from a hub (12) in a radial direction. A segment (20) is present that has a plurality of spokes (22), and both inner and outer radial bonding ends (24, 26). The plurality of spokes (22) engage both of these bonding ends (24, 26). The outer radial bonding end (24) is attached to the shear band (16) using adhesive (28), and the inner radial bonding end (26) is attached to the hub (12) using adhesive (28). This segment (20) extends less than 360 degrees about the central axis (14) in a circumferential direction.

12 Claims, 11 Drawing Sheets

(56) References Cited

U.S. PATENT DOCUMENTS

| | | |
|---|---|---|
| 2008/0053586 A1 | 3/2008 | Hanada et al. |
| 2011/0003920 A1 | 1/2011 | Matsuda et al. |
| 2011/0146872 A1* | 6/2011 | Tercha .................. B60C 17/043 |
| | | 152/520 |
| 2011/0180194 A1 | 7/2011 | Anderson et al. |
| 2015/0343856 A1 | 12/2015 | Endo et al. |
| 2018/0333984 A1* | 11/2018 | Wilson ..................... B60C 7/18 |
| 2019/0009613 A1 | 1/2019 | Cron et al. |
| 2022/0379662 A1* | 12/2022 | Gualtieri ................. B60C 7/146 |

OTHER PUBLICATIONS

European Patent Office, International Search Report dated May 25, 2020, pp. 1-13 (included), European Patent Office, Rijswijk, The Netherlands, for PCT/US2019/063556.

* cited by examiner

US 12,187,000 B2

1

METHOD OF ASSEMBLING SPOKES INTO A NON-PNEUMATIC TIRE

CROSS-REFERENCE TO RELATED APPLICATIONS

The present application is a 35 U.S.C. § 371 application of PCT/US2019/063556 filed on Nov. 27, 2019 and entitled "Method of Assembling Spokes Into A Non-Pneumatic Tire." PCT/US2019/063556 is incorporated by reference herein in its entirety for all purposes.

FIELD OF THE INVENTION

The subject matter of the present invention relates to a method of assembling spokes into a non-pneumatic tire that can be used in the production of a new non-pneumatic tire, or that can be used to repair a damaged non-pneumatic tire. More particularly, the present application involves a method of assembling spokes into a non-pneumatic tire that uses a segment that includes a plurality of spokes that are attached to two bonding surfaces that could be attached to a hub and shear band of the non-pneumatic tire.

BACKGROUND OF THE INVENTION

Non-pneumatic tires are those that do not require air or other fluid for their inflation for use. Some non-pneumatic tires have a plurality of spokes arranged circumferentially around and attached to a hub. On their opposite end, the spokes are attached to a shear band. To build the spoke component of the non-pneumatic tire, it is known to combine various products into a multi-component product and then cure this product in a mold. The hub may include slots into which individual spokes are inserted for retention. Adhesives could also be applied to this slotted connection to further secure the attachment. On their opposite ends, the spokes could be attached to the shear band through adhesives. The attachment of the spokes is done individually such that each spoke is attached in an individual manner to the hub and shear band.

During manufacturing of the non-pneumatic tire, and through normal use of the non-pneumatic tire, one or more of the spokes may become damaged to an extent that they no longer perform their intended structural function. Unfortunately, unlike pneumatic tires that can be patched or otherwise repaired when a puncture occurs, there is no method currently available to replace or repair these damaged spokes in non-pneumatic tires. In such instances, the entire non-pneumatic tire must be scrapped once a sufficient number of spokes become damaged.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

2

Figure 5:
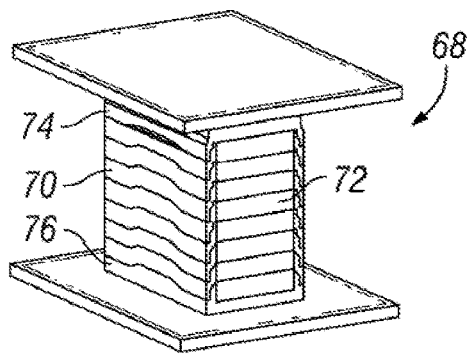
FIG. 5 is a perspective view of a floating mold for molding a segment.
Figure 6:
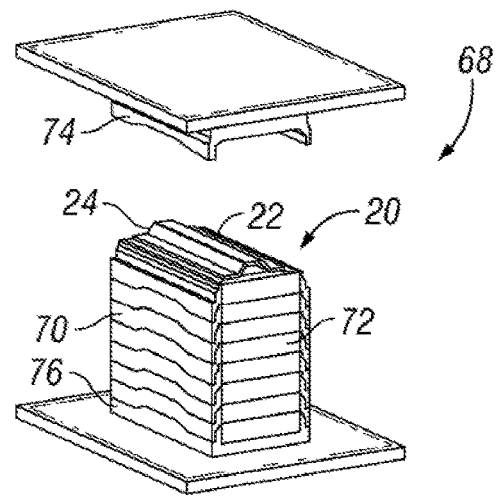

FIG. 6 is a perspective view of the floating mold of FIG. 5 with the end piece removed.

Figure 7:
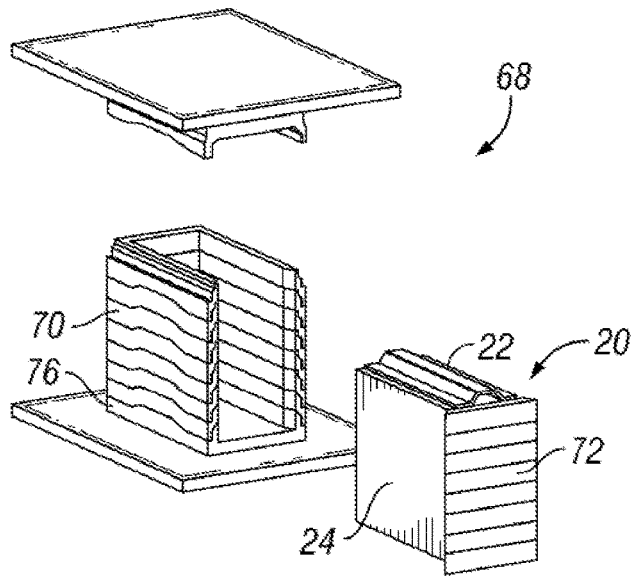

FIG. 7 is a perspective view of the floating mold of FIG. 6 with the segment and inserts removed from the base pieces.

Figure 8:
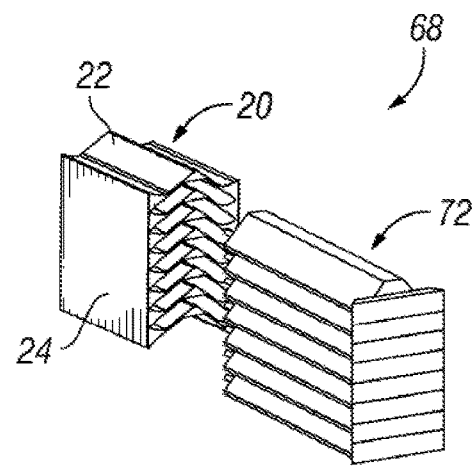

FIG. 8 is a perspective view of the segment demolded from the inserts.

Figure 9:
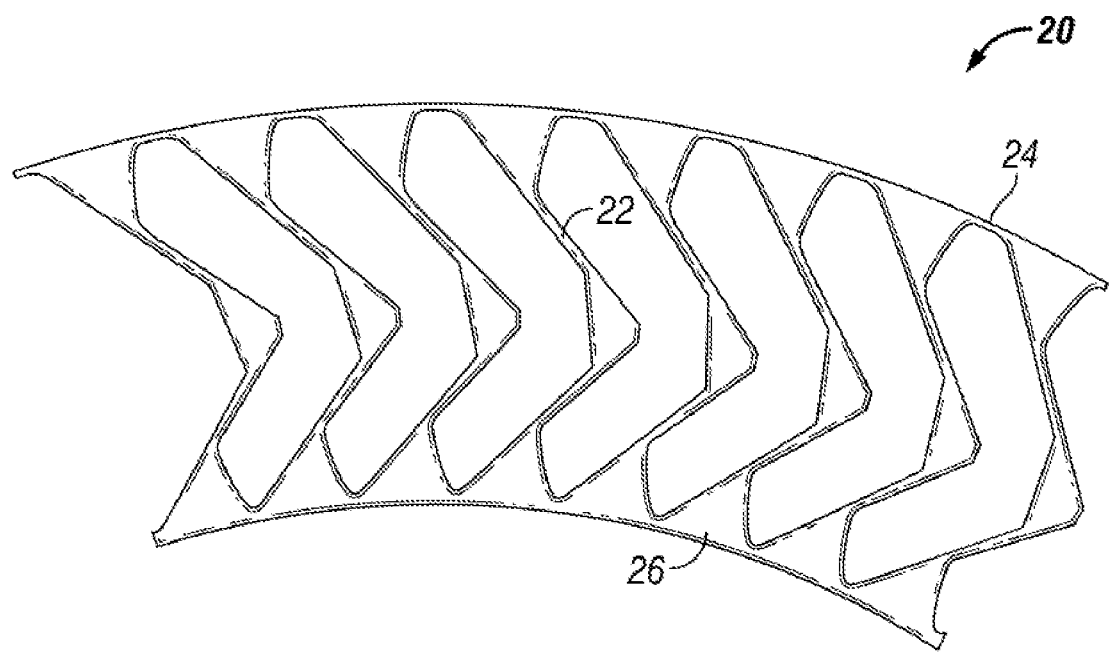

FIG. 9 is a side view of a curved segment of spokes.

Figure 10:
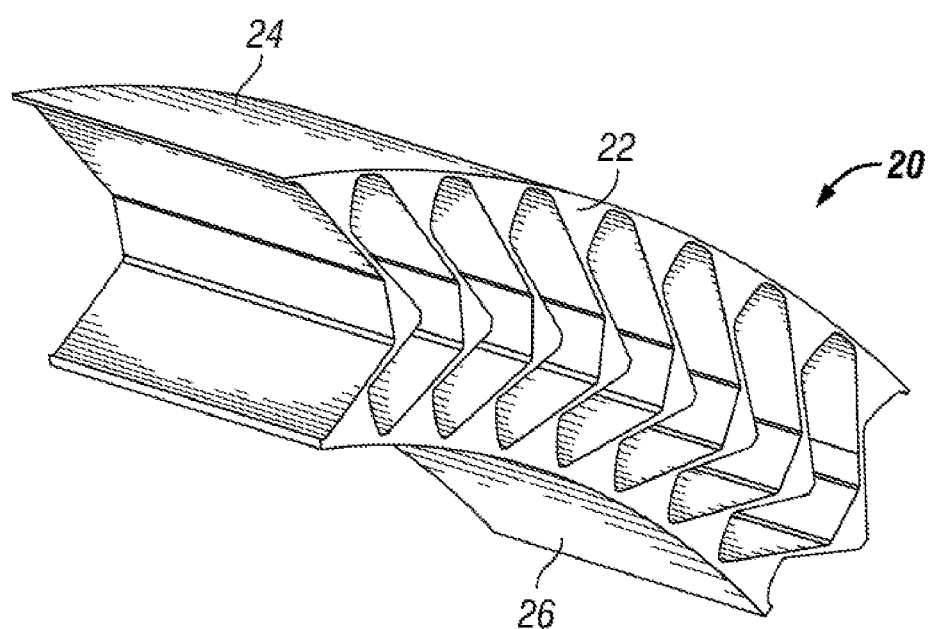

FIG. 10 is a perspective view of FIG. 9.

Figure 11:
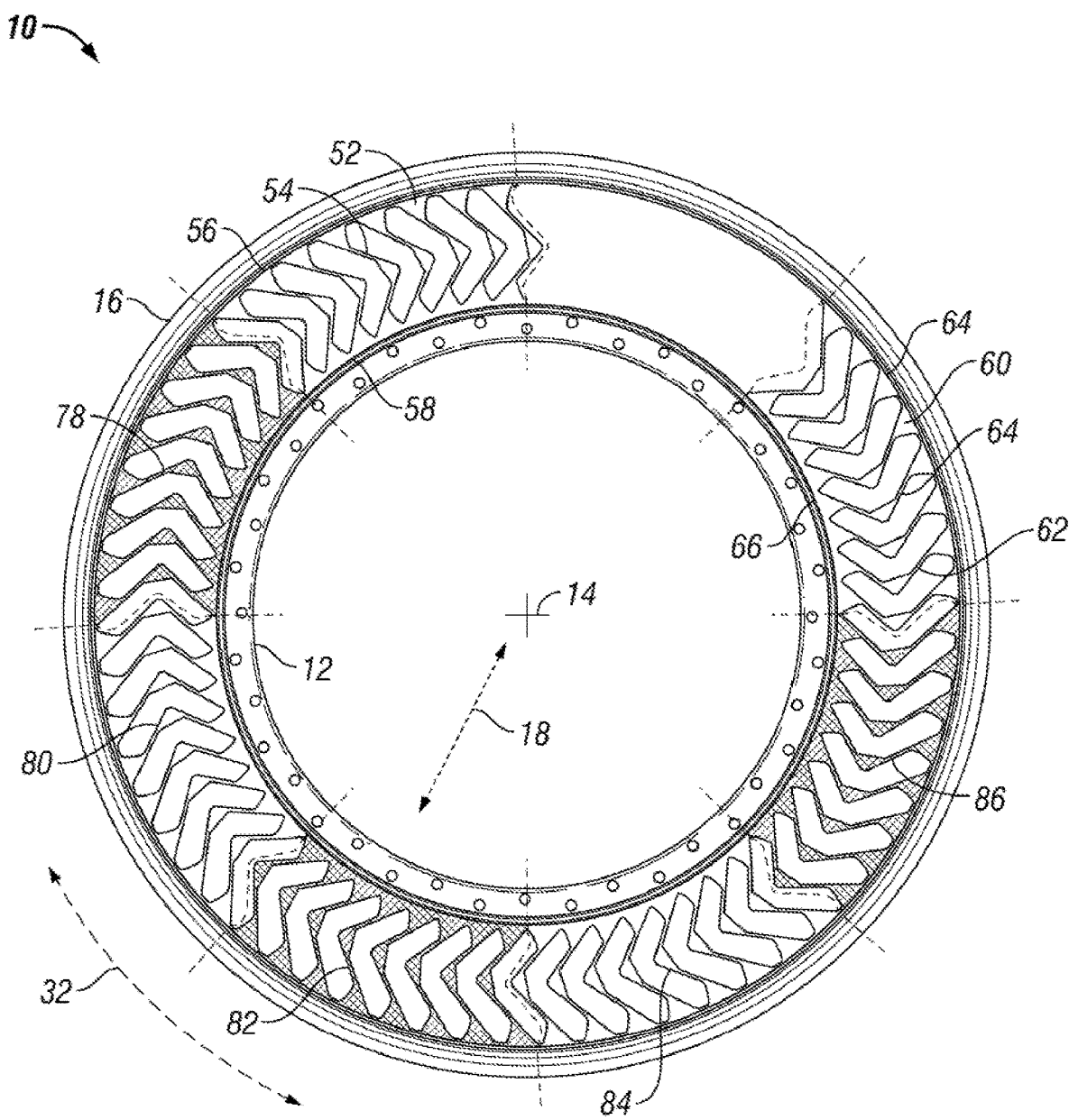

FIG. 11 is a side view of a non-pneumatic tire with eight modular segments of spokes in which one segment is missing.

Figure 12:
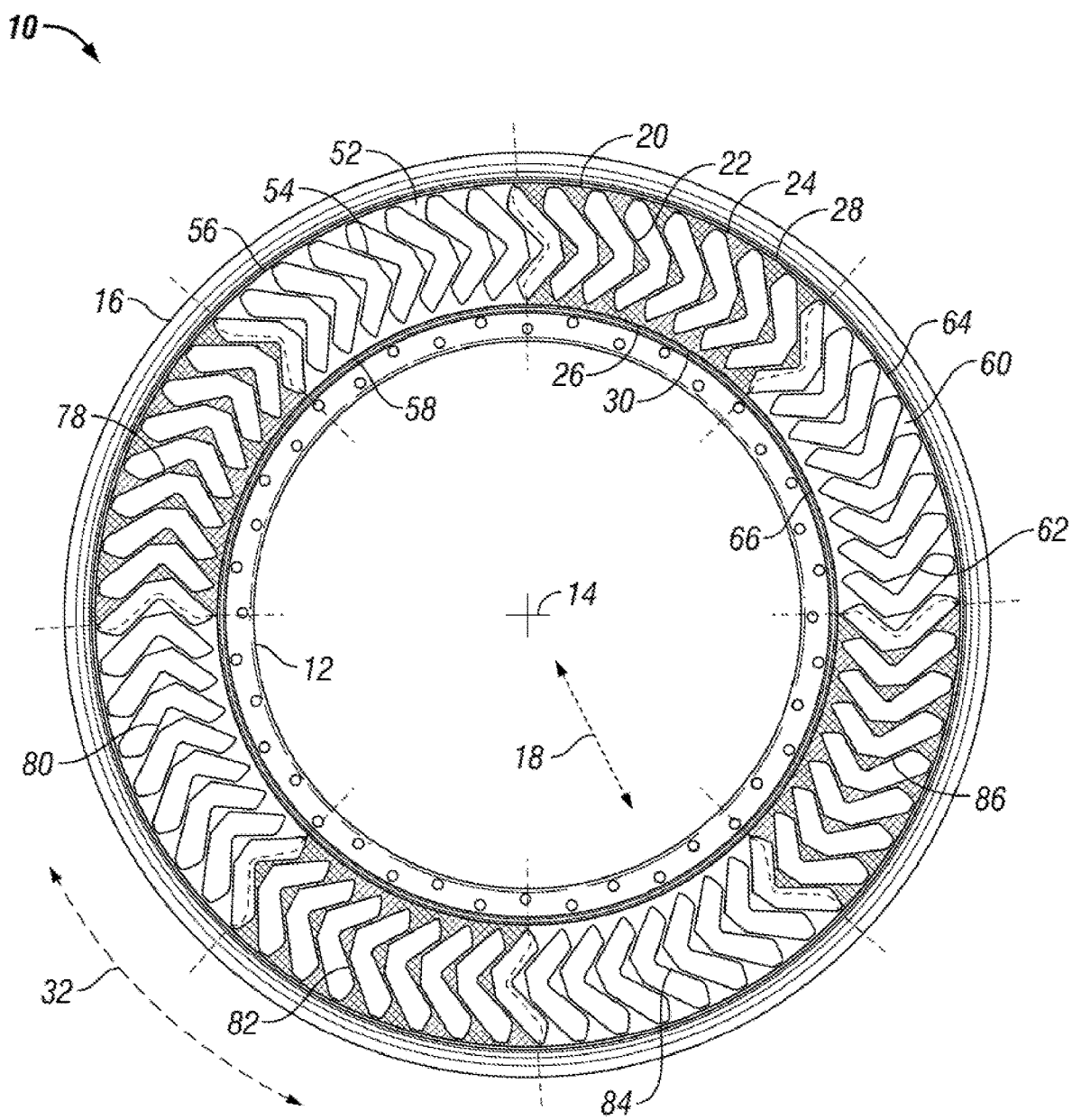

FIG. 12 is a side view of the non-pneumatic tire of FIG. 11 with the missing segment attached to complete the tire.

Figure 13:
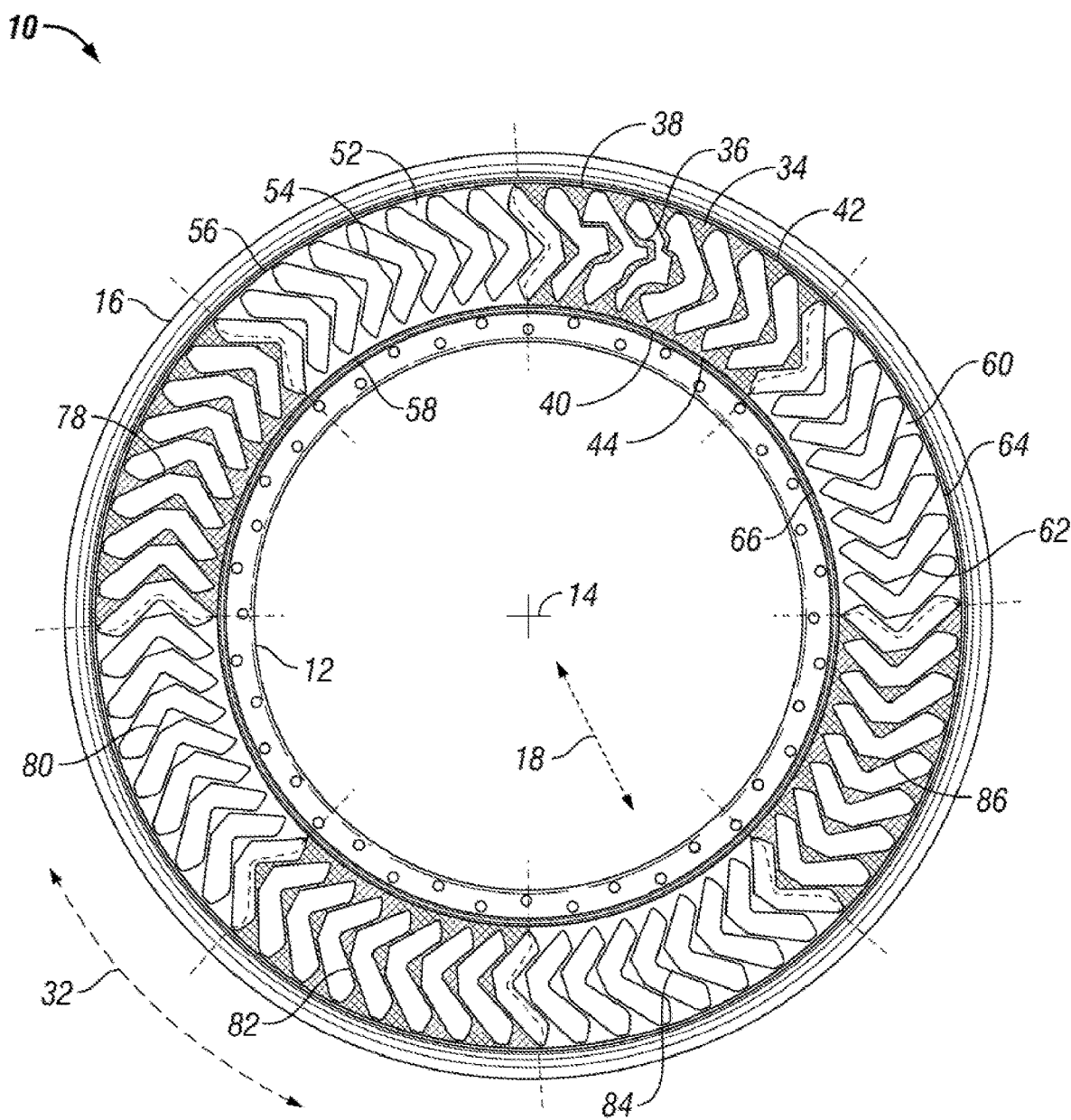

FIG. 13 is a side view of a non-pneumatic tire with a segment of spokes that has damaged spokes.

Figure 14:
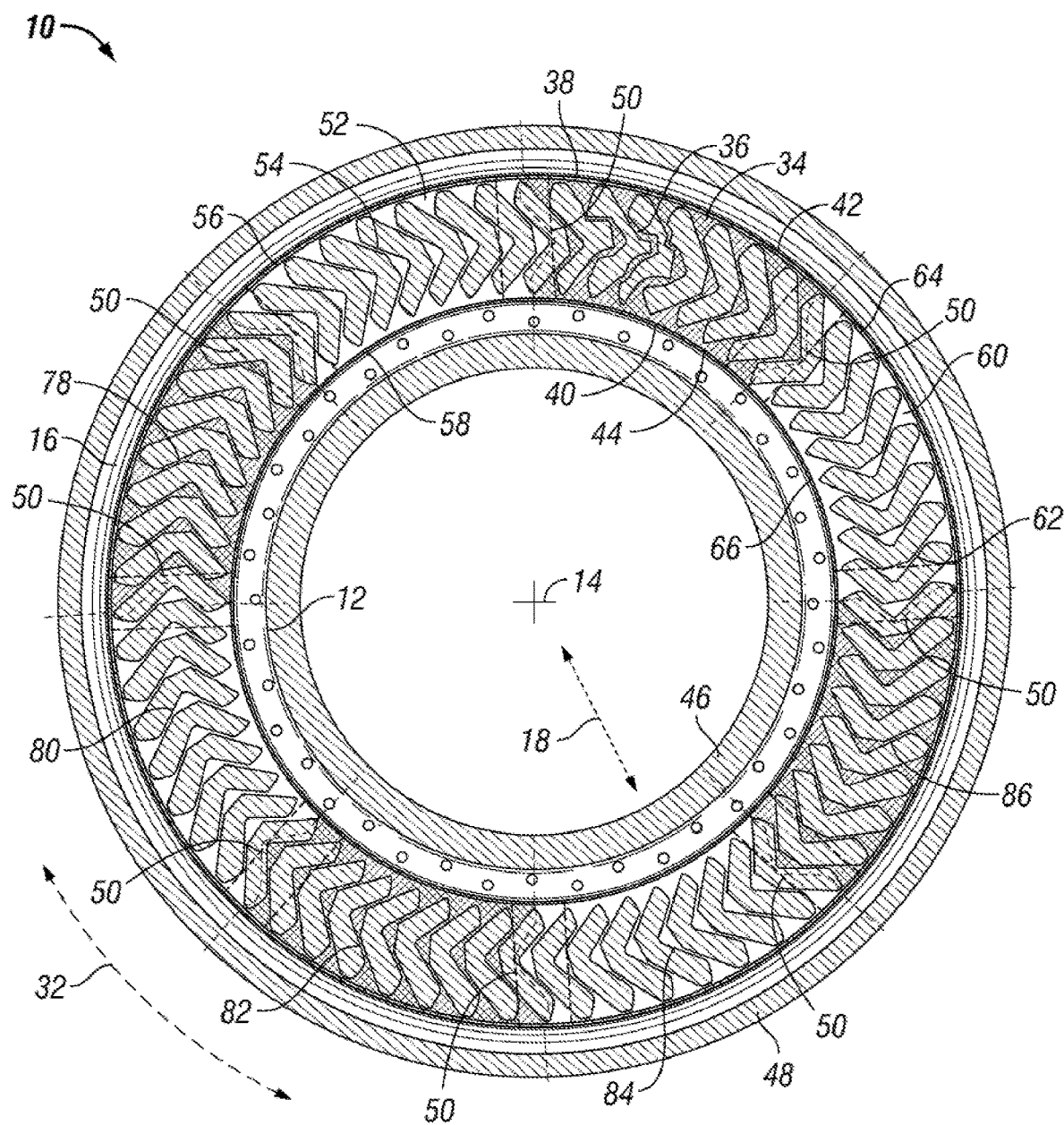

FIG. 14 is a side view of the tire of FIG. 13 with the tire inserted into an inner fixture and an outer fixture.

Figure 15:
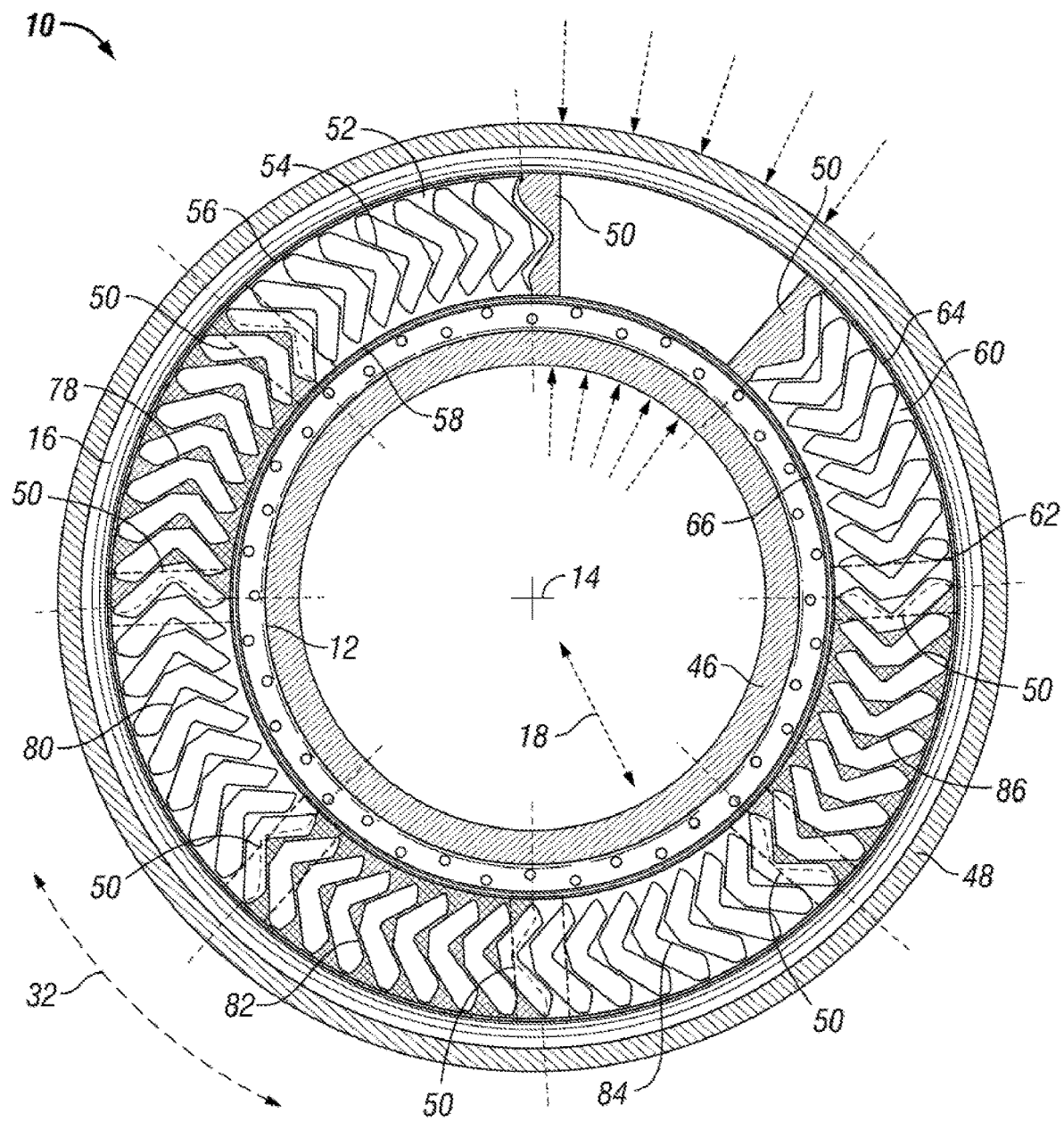

FIG. 15 is a side view of the tire of FIG. 14 with the segment having the damaged spokes removed.

Figure 16:
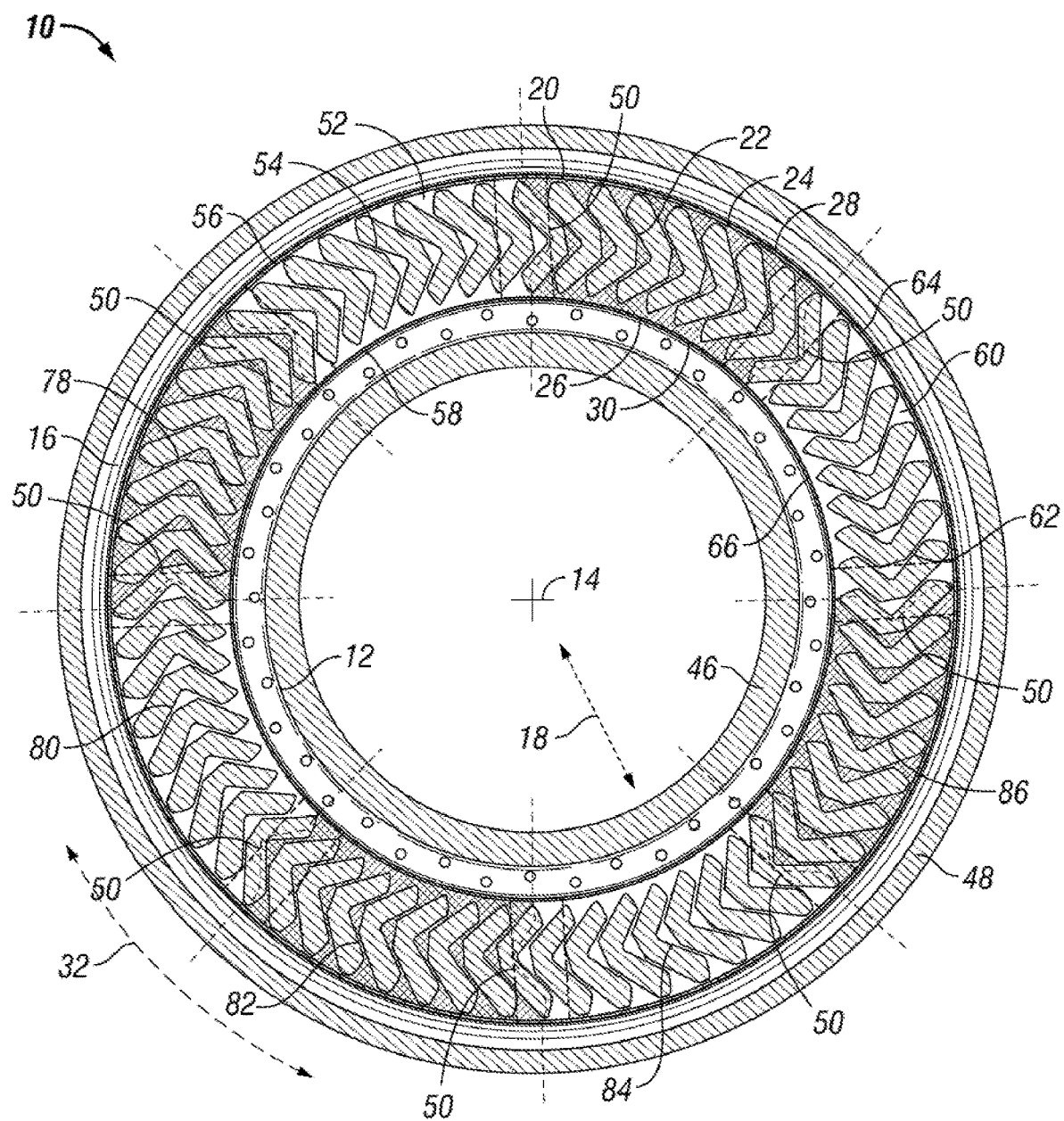

FIG. 16 is a side view of the tire of FIG. 15 with a new undamaged segment inserted into the cavity made through removal of the undamaged segment.

Figure 17:
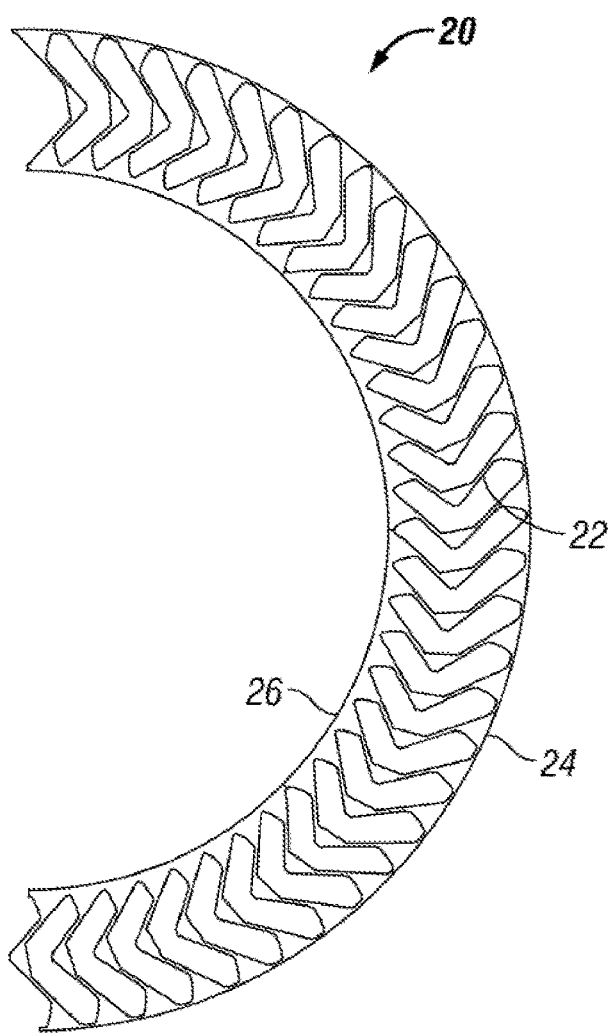

FIG. 17 is a side view of a segment of spokes that is curved so as to extend 180 degrees about a central axis in a circumferential direction.

Figure 18:
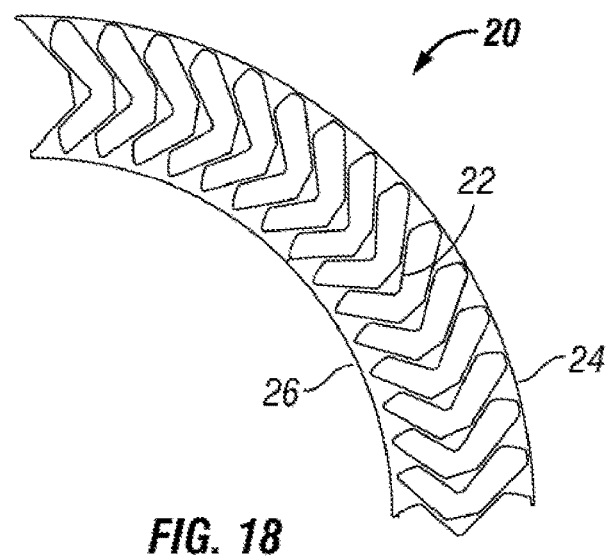

FIG. 18 is a side view of a segment of spokes that is curved so as to extend 90 degrees about a central axis in a circumferential direction.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a method for assembling spokes 22 into a non-pneumatic tire 10. The method includes providing a segment 20 that has a plurality of spokes 22, an outer radial bonding end 24, and an inner radial bonding end 24. The plurality of spokes 22 are numbered and sized so that they will extend less than 360 degrees about a central axis 14. The non-pneumatic tire 10 has a hub 12 and a shear band 16, and the outer radial bonding end 24 is attached to the shear band 16 via adhesive 28. The inner radial bonding end 26 is attached to the hub 12 via adhesive 30. One or more additional segments that likewise include a plurality of spokes are similarly positioned around and attached to the hub 12 and shear band 16 so that spokes completely circle 360 degrees the central axis 14. Other embodiments exist in which the adhesive 28, 30 is releasably attachable to the hub 12 and the shear band 16. In this regard, should one or more of the plurality of spokes 22 become damaged it may be desired to replace them with undamaged spokes 22 so that the non-pneumatic tire 10 can remain in service and need not be thrown out, or for simply cosmetic reasons. In this case, heat or some other activation mechanism can be employed to cause the adhesive 28, 30 to lose its adhesive properties so that the inner radial bonding end 26 becomes disengaged from the hub 12, and so that the outer radial bonding end 24 becomes disengaged from the shear band 16. The damaged segment with the damaged spokes 22 can be removed and a new, undamaged segment with undamaged spokes 22 can be subsequently attached to the hub 12 and shear band 16 in the manner previously described. The method of attachment thus includes attaching segments 20 to new non-pneumatic tires 10, and attaching segments 20 to damaged non-pneumatic tires 10 for purposes of structural repair or cosmetic repair. The outer and inner radial bonding ends 24, 26 may include reinforcements such as nylon, glass resin, plastic, metal or other elements that function to strengthen the ends 24, 26 and allow the segment 20 to be manipulated into the assembly. In some embodiments, reinforcements need not be placed into the ends 24, 26 if they are thick enough to provide the required strength for their manipulation and assembly.

Figure 1:
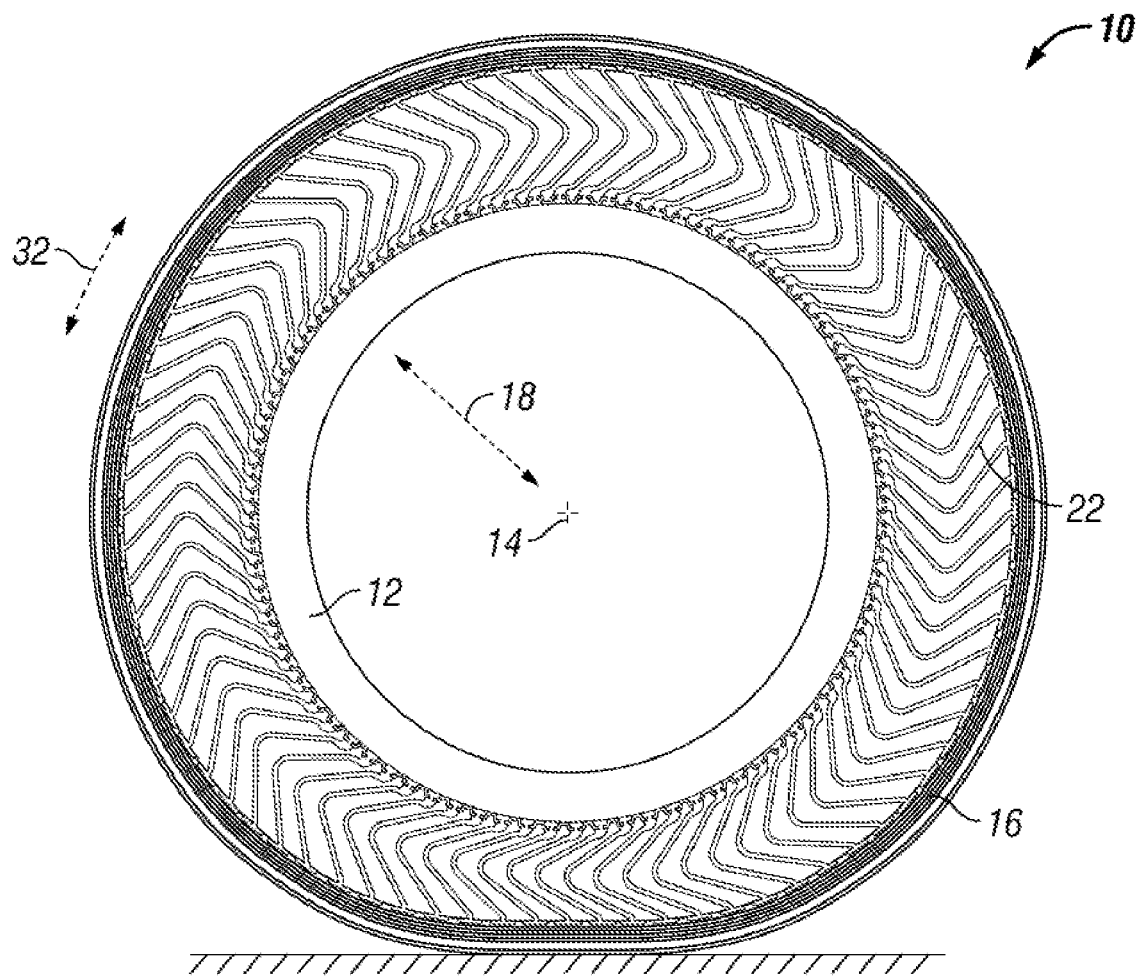
FIG. 1 is a side view of a non-pneumatic tire.

FIG. 1 shows a non-pneumatic tire 10. The non-pneumatic tire 10 has a hub 12 with a central axis 14 at its center, and the radial direction 18 extends from the central axis 14. Tread is located on the outer exterior of a shear band 16 and extends all the way around the non-pneumatic tire 10 in the circumferential direction 32. The shear band 16 is located inward in the radial direction 18 from the tread and likewise extends 360 degrees around the central axis 14 in the circumferential direction 32. A series of spokes 22 engage the shear band 16 and extend inward in the radial direction 18 from the shear band 16 to the hub 12 of the non-pneumatic tire 10. Any number of spokes 22 can be present, and their cross-sectional shape can be different from that shown. In some instances, between 64-80 spokes 22 are present in the non-pneumatic tire 10. The hub 12 is located inward from the spokes 22 in the radial direction 18 and can be mounted onto a wheel of the vehicle. The spokes 22 at the top of the non-pneumatic tire 10 are in tension, and the spokes 22 at the bottom are in compression as the non-pneumatic tire 10 rests on the ground and as the non-pneumatic tire 10 turns in normal operation of the vehicle.

Figure 2:
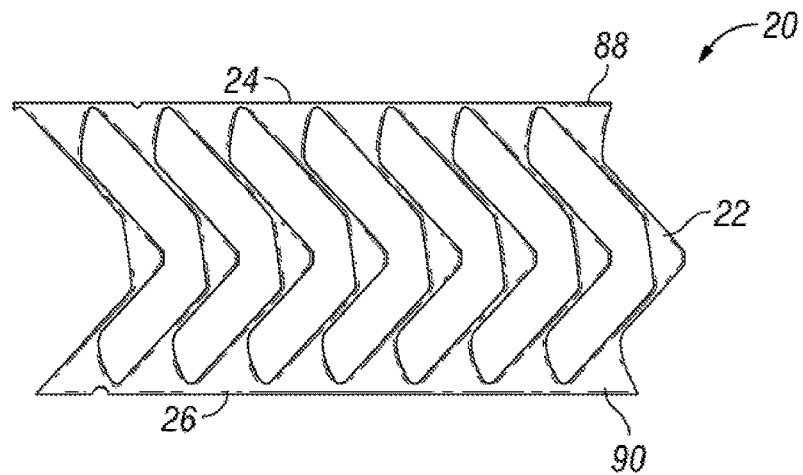
FIG. 2 is a side view of a segment having spokes in accordance with one exemplary embodiment.

A segment 20 is shown in side view in FIG. 2 and includes a plurality of spokes 22. Each of the spokes 22 includes a pair of legs that have triangular shaped ends. The central body of the spoke 22 is also made with a triangular shaped cross-section. The spoke 22 can be molded out of a single material, or may be made from a plurality of materials in some embodiments. Multiple layers of material can be placed onto one another and then positioned into a mold for curing. It is to be understood that the shape and size of the spoke 22 can be varied in accordance with different exemplary embodiments, and that a variety of spoke 22 configurations are possible. Materials making up the spoke 22 may include rubber, urethane, and/or polyurethane in accordance with different exemplary embodiments. The spokes 22 may also include reinforcements that can be made of nylon, plastic, and metal. The spoke 22 extends from a first end to a second end and may have an extension from end to end greater than, less than, or the same as the height of the spoke 22.

The segment 20 has an outer radial bonding end 24 located on one end, and an oppositely disposed inner radial bonding end 26 located at an opposite end. The bonding ends 24, 26 are generally featureless surfaces that are flat in the FIG. 2 embodiment but could be curved in other embodiments. The bonding ends 24, 26 extend between successive spokes 22 so that the spokes 22 are linked to one another via the intermediate portion of the bonding ends 24, 26 therebetween. The bonding ends 24, 26 can be separate components that are located on the ends of the spokes 22 such that the bonding ends 24, 26 could be members that are attached to the ends 24, 26 and extend the entire length of the segment 20. Materials making up the spoke ends 24, 26 may include rubber, urethane, and/or polyurethane. Alternatively, the bonding ends 24, 26 could be composed of the ends of the spokes 22. For example, the outer ends of the spokes 88 could be formed so that they engage ends 88 of successive spokes 22 and thus form the outer radial bonding end 24. The inner ends of spokes 90 could likewise be made so that they engage inner ends 90 of subsequent spokes 22 thus making up the inner radial bonding end 26. Other variations are possible in which one of the bonding ends 24, 26 is made of a separate component, and the other one of the bonding ends 24, 26 is made via attached formation of the ends 88 or 90. It is to be understood that the outer radial bonding end 24 could be made of a separate component, the outer end 88 of spokes 22, or a combination of the outer ends 88 and a separate component. Further, the inner radial bonding end 26 could be made of a separate component, the inner ends 90 of spokes 22, or a combination of both the inner ends 90 and some other separate component. The bonding ends 24, 26 can be specifically formulated and formed for bonding with the hub 12 and shear band 16 through the use of adhesives 28, 30.

Figure 3:
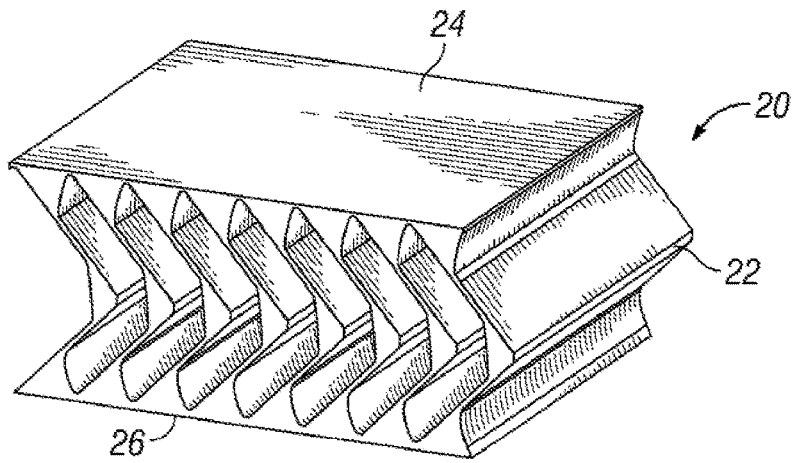
FIG. 3 is a perspective view of the segment of FIG. 2.

FIG. 3 shows a perspective view of the segment 20 from FIG. 2. The width of the spokes 22 is less than the length of the segment 20, but may be greater than the height of the spokes 22. These relative sizes could be different in other arrangements. Although eight spokes 22 are shown, any number of spokes greater than one could be present in other embodiments. For instance, 16, 32, from 2 to 7, from 9 to 12, from 13 to 15, from 17 to 31, from 33 to 64, from 65 to 100, or up to 200 spokes 22 could be present in the segment 20 in other embodiments. The segment 20 is integral in that the spokes 22 are all connected either by one another through successive spoke 22 connection, or through attachment via the bonding ends 24, 26. The components 24, 26, 22 could be separately formed and then permanently attached to one another through adhesives, welding, or any other mechanism. Once formed, the segment 20 is a single piece having components 24, 22, 26 that could be made of different materials. The outer and inner radial bonding ends 24, 26 are provided as single, uninterrupted pieces that form the ends of the segment 20. There is no discontinuity between the spokes 22 such that the outer and inner radial bonding ends 24, 26 do not have holes or depressions or other irregularities. The surfaces of the ends 24, 26 may be flat or curved depending upon the overall construction of the segment 20. However, some embodiments exist in which the bonding ends 24, 26 do in fact have holes, projections, depressions, or other irregularities associated with their surfaces.

Figure 4:
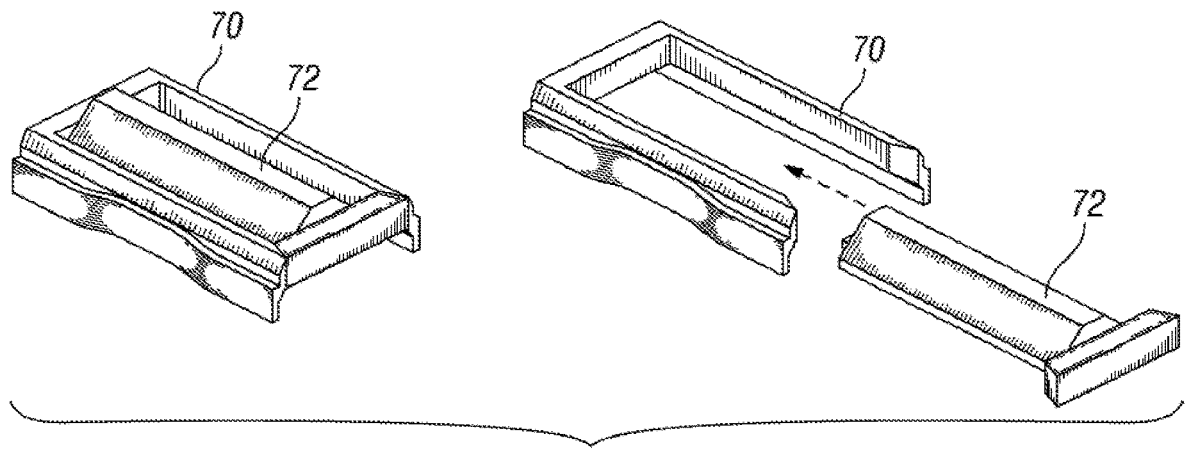
FIG. 4 is a perspective view of a base piece and an insert capable of molding a portion of the segment.

The segment 20 could be constructed in a variety of manners. FIG. 4 shows a base piece 70 and an insert 72 that can be used to construct the segment 20. The base piece 70 and insert 72 are part of a floating mold 68 that may be used to mold the segment 20. The insert 72 can be moved relative to the base piece 70 and can be completely detached therefrom, or can be moved and located within the base piece 70. An uncured spoke 22 may be formed from one or more uncured components and can be placed onto the top of the insert 72 when the insert 72 is placed into the base piece 70. A plurality of base piece 70/insert 72 sections can be provided with each having an uncured spoke 22 located therein. These loaded base piece 70/insert 72 sections can then be placed on top of one another such that the loaded base piece 70/insert 72 nests with a successive loaded base piece 70/insert 72. FIG. 5 shows one such possible configuration in which the loaded base pieces 70 and inserts 72 are nested into one another with the uncured spokes 22 to form an array. The very top and bottom of the array are formed with end pieces 74, 76. These end pieces 74, 76 have forming surfaces that engage spokes 22 and are mounted on opposite ends to flat panels that could provide pressing surfaces for a platen, not shown, or other pressing device capable of applying force to the mold 68. These flat panels need not be present in other embodiments, and the end pieces 74, 76 could be configured differently. The mold 68 illustrated is a floating mold 68, but other types could be employed. Further, although shown as employing two pieces 70 and 72, any number of pieces could be used for molding the particular spoke 22 of the segment 20. The stack of base pieces 70 and inserts 72 can be made taller or shorter by adding or removing them so that the resulting segment 20 will be of a desired size and have a desired number of spokes 22 therein.

A sufficient amount of force and heat is applied to the floating mold 68 to cause the spokes 22 to be subjected to the proper amount of heat and pressure for curing. Once sufficient time has elapsed, the heat and pressure on the floating mold 68 can be removed and the floating mold 68 can be opened. The removal of the end piece 74 is shown with reference to FIG. 6. The outer and inner radial bonding ends 24, 26 could be sheets of material that are inserted along the heights of the stacked base pieces 70 and inserts 72, or the outer and inner radial bonding ends 24, 26 could instead be formed via the outer ends 88, 90 of the spokes 22. In this regard, the outer ends 88, 90 could flow a slight distance onto one another in the floating mold 68 during curing and engage one another to form the ends 24, 26. Whether a separate component, or a portion of the outer ends 88, 90, the outer and inner radial bonding ends 24, 26 can be cured at the same time the spokes 22 are cured in the floating mold 68. A sheet of nylon reinforced material can be used to help form ends 24, 26 and this sheet may be inserted before the first green spoke 22, and subsequently manipulated into position as the remaining green spokes 22 get aligned. The ends 24, 26 may be formed with green components split into sections attached to each one of the green spokes 22.

After the end piece 74 is removed from the stacked base pieces 70 and inserts 72, the molded segment 20 and the various inserts 72 may be likewise removed from the base pieces 70 as shown in FIG. 7. In some cases the end piece 74 need not be removed from the stacked base pieces 70/inserts 72, but pressure on the end pieces 74, 76 need only be removed to allow the segment 20 and inserts 72 to be slid out. Subsequently, once the molded segment 20 and the inserts 72 have been removed, the molded segment 20 must be demolded from the inserts 72. FIG. 8 shows the removal of the various inserts 72 from the area between the spokes 22 to result in a segment 20 that is formed with the bonding ends 24, 26 and spokes 22 as an integrally formed single piece. The detachment of the inserts 72 from the base pieces 70 may be done for demolding purposes as the uncured spokes 22 could be loaded into the mold 68 with the inserts 72 located within the base pieces 70. Still further, although shown as using the removable inserts 72, the segment 20 could be constructed via other molding arrangements in other embodiments without the need to have any removable inserts 72 or other removable mold 68 parts. The floating mold 68 illustrated yields a straight segment 20, but a pivoting mold 68 could be employed in other arrangements to make a curved segment 20 if desired. The mold 68 could also be cured with no pivoting and the segments 20 inserted circumferentially instead of axially. In such instances the operation in the press would be different than that shown in the figures.

FIGS. 9 and 10 show a curved segment 20 that has 8 spokes 22 in addition to the outer radial bonding end 24 and inner radial bonding end 26. The bonding ends 24, 26 follow curved paths and the outer radial bonding end 24 may be longer in the circumferential direction 32 than the inner radial bonding end 26. The spokes 22 are likewise arranged next to one another along a curved path between the ends 24, 26 so that they extend in a circumferential direction 32 of the tire 10. The ends 24, 26 can be made of the same material as the spokes 22, or may be made of a different material or materials from the spokes 22. The ends 24, 26 may be made of rubber, plastic, or a combination of rubber and plastic, and the ends 24, 26 are made of materials suitable for bonding with other components of the tire 10. Reinforcements can be included in the ends 24, 26 and may be included in other portions of the spokes 22. Any type of manufacturing process may be utilized for forming the curved segment 20. The curved segment 20 can be molded so that the various components 22, 24, 26 are formed into a single unitary piece. The spokes 22 may be made so that they exhibit some degree of flexibility as they will flex during driving of the non-pneumatic tire 10. It is to be understood that the present method includes embodiments where the segments 20 are formed as straight segments, and where the segments 20 are formed as curved segments.

FIG. 11 is a side view of a non-pneumatic tire 10 undergoing the construction process. The hub 12 and shear band 16 are shown assembled, and it is to be understood that tread may be present on the outside of the shear band 16 that engages the road. Alternatively, the tread could be later attached to the outside of the shear band 16. Most, but not all of the spokes 22 are shown assembled into the tire 10. The spokes 22 are located in various segments that are attached to the hub 12 and shear band 16. An empty cavity devoid of spokes 22 is shown at roughly the top of the tire 10 in FIG. 11, and a second segment 52 is immediately adjacent this empty space at the counterclockwise position. The second segment 52 has a second plurality of spokes 54 that are 8 in number. A second outer radial bonding end 56 is included in the second segment 52 and engages the inner surface of the shear band 16, and a second inner radial bonding end 58 is likewise included in the second segment 52 and engages the hub 12. The second segment 52 may be formed as previously discussed and can be assembled into the hub 12 and shear band 16. On the opposite side of the cavity, immediately clockwise to the cavity, is a third segment 60 that features a plurality of spokes 62 that are 8 in number. The third segment 60 has a third outer radial bonding end 64 that engages the inner surface of the shear band 16, and a third inner radial bonding end 66 that engages the outer surface of the hub 12. The third segment 60 can be constructed in manners previously discussed.

Additional segments can be positioned around the tire 10 as needed so that the spokes extend completely 360 degrees about the central axis 14 in the circumferential direction 32. The additional segments shown in FIG. 11 include a fourth segment 78 and arranged from it in the counterclockwise direction successively a fifth segment 80, a sixth segment 82, a seventh segment 84, and an eighth segment 86. All of these segments 78, 80, 82, 84, 86 include spokes and ends and can be produced and configured in manners previously discussed. All of the segments 52, 60, 78, 80, 82, 84, 86 may be identically formed with one another and all have 8 spokes and be connected between the hub 12 and shear band 16.

Border marks are shown in FIG. 11 to denote the boundaries between the various segments 52, 60, 78, 80, 82, 84, 86.

FIG. 12 shows the tire 10 of FIG. 11 but with the first segment 20 attached to the tire 10 to complete its construction. The first segment 20 includes the first plurality of spokes 22, the first outer radial bonding end 24, and the first inner radial bonding end 26 and can be constructed and arranged as previously discussed. If provided as a straight member, like in FIGS. 2 and 3, the first segment 20 can first be curved before insertion into the tire 10. Adhesive 28 may be applied to the outer radial bonding end 24, the inner surface of the shear band 16, or both. Further, adhesive 30 may be applied to the inner radial bonding end 26, the hub 12, or both. The first segment 20 can then be inserted between the hub 12 and the shear band 16 into the illustrated position in FIG. 12. Pressure may be applied so that the first segment 20 is squeezed between the hub 12 and shear band 16 to cause the first segment 20 to be attached to the hub 12 and shear band 16 to complete the formation of the non-pneumatic tire 10. The adhesive 28, 30 can be permanent in that once the segment 20 is attached to the hub 12 and shear band 16, it cannot be removed therefrom. Alternatively, the adhesive 28, 30 can be releasable adhesive in that its effects attachment, but when some activation mechanism is employed the adhesive 28, 30 loses some or all of its adhesive properties allowing the segment 20 to be removed from the non-pneumatic tire 10 and replaced with a subsequent new segment 20. This releasable adhesive 28, 30 may be useful to allow damaged segments 20 to be repaired.

All of the segments 20, 52, 60, 78, 80, 82, 84, 86 may be identical to one another and all have 8 spokes and all extend the same arc length around the central axis 14 in the circumferential direction 32. However, other embodiments are possible in which the various segments 20, 52, 60, 78, 80, 82, 84, 86 have different arc lengths and have different numbers of spokes such that some of the segments 20, 52, 60, 78, 80, 82, 84, 86 are longer or shorter than others with a greater or lesser number of spokes. It is to be understood that the use of 8 segments 20, 52, 60, 78, 80, 82, 84, 86 with 64 total spokes is but one exemplary embodiment and other numbers of the segments and spokes are possible. The various spokes 22 and/or segments 20, 52, 60, 78, 80, 82, 84, 86 can have the same or different properties, performances, and/or functions as or from one another. Although shown and described as putting the segments 20, 52, 60, 78, 80, 82, 84, 86 into the hub 12 and shear band 16 in sequence between the hub 12 and shear band 16, it is to be understood that other methods of construction are possible. In one such assembly method, all of the segments 20, 52, 60, 78, 80, 82, 84, 86 could be simultaneously placed onto the hub 12, or sequentially placed onto the hub 12, and then the shear band 16 could be subsequently attached to the segments 20, 52, 60, 78, 80, 82, 84, 86. Another assembly method includes first attaching the various segments 20, 52, 60, 78, 80, 82, 84, 86 to the shear band 16, and then after this attachment moving the hub 12 into position and into attachment with the segments 20, 52, 60, 78, 80, 82, 84, 86. Further, although shown and described as having but a single row of spokes, two, three, or more rows of spokes 22 positioned next to one another in the axial direction can be used to build the tire 10. The rows may have spokes 22 oriented in the same direction, or they may alternate such that one row has spokes 22 oriented one way and the adjacent row has the spokes 22 oppositely oriented. If multiple rows of spokes 22 are incorporated into the tire 10, all of the rows of spokes 22 may feature segments 20 that are removable and replaceable so that all of the rows can be repaired if needed. Alternatively, the tire 10 can feature multiple rows of spokes 22 in which one or more of the rows of spokes 22 are not repairable such that segments 20 cannot be removed from these one or more rows. However, one or more of the rows of this tire 10 could be repairable such that damaged segments 34 could be removed and replaced with new segments 20.

The method of assembly has been described with the attachment of the segments 20, 52, 60, 78, 80, 82, 84, 86 to the hub 12 and shear band 16. However, other assembly steps may exist in which the segments 20, 52, 60, 78, 80, 82, 84, 86 are additionally attached to successive segments 20, 52, 60, 78, 80, 82, 84, 86. For instance, the first segment 20 could be attached to the second segment 52. In this regard, the outer radial bonding end 24 is attached to the second outer radial bonding end 56, and the inner radial bonding end 26 is attached to the second inner radial bonding end 58. Additionally or alternatively, the spoke 22 at the end of the segment 20 facing the second segment 52 can be attached to the immediately adjacent spoke 54 of the second segment 52. The attachments can be with permanent adhesive, or with releasable adhesive. Further, the outer and inner radial bonding ends 24, 26 can be attached to the respective third outer and third inner radial bonding ends 64, 66 of the third segment 60. Additionally or alternatively, the immediately adjacent spokes 22, 62 of the first and third segments 20, 60 can be attached to one another. These attachments can be through permanent or releasable adhesives. All successive segments 52, 60, 78, 80, 82, 84, 86 could likewise be attached permanently or through releasable adhesives as well.

The method of assembly of a new non-pneumatic tire 10 thus employs one or more modular segments 20 that has a plurality of spokes 22. The modular segments 20 are constructed separately from the hub 12 and shear band 16 and are provided as a single attached piece so that the spokes 22 are all held together in this single piece. The modular segment 20 is then subsequently attached to the hub 12 and shear band 16 using adhesives 28, 30. In addition to forming a new non-pneumatic tire 10, the present method also allows for the repair of a damaged non-pneumatic tire 10. FIG. 13 shows a non-pneumatic tire 10 that can be constructed in accordance with the method previously discussed. Through normal use of the non-pneumatic tire 10 damage to the spokes may occur in which the spokes become cracked or pieces fall off. This damage may be as a result of the tire 10 hitting objects or through wear over time through use of the tire 10. The damaged segment 34 includes a plurality of spokes 36 some of which may be damaged as shown. The damaged segment 34 has a damaged segment outer radial bonding end 38 that is attached to the inside of the shear band 16, and a damaged segment inner radial bonding end 40 that is attached to the hub 12. The damaged segment 34 may be constructed and attached to the non-pneumatic tire 10 in the same manners as previously discussed. The adhesive that is used to attach the damaged segment outer radial bonding end 38 is releasable adhesive 42, and can be activated via some mechanism to have its adhesive properties removed or reduced. Further, the adhesive that is used to attach the damaged segment inner radial bonding end 40 is releasable adhesive 44 that can be activated in some manner to allow the end 40 to be released from the hub 12.

To repair the damaged segment 34, the non-pneumatic tire 10 can be put into engagement with an inner fixture 46 and outer fixture 48. FIG. 14 shows the damaged non-pneumatic tire 10 placed into fixtures 46, 48. The fixtures 46, 48 can be static to hold the non-pneumatic tire 10 into position, or could be movable to cause certain portions of the tire 10 to move relative to other portions. The damaged segment 34 can be identified and placed into an appropriate position in the FIGS. 46, 48 if needed. A plurality of supports 50 are attached to and extend between the inner and outer fixtures 46, 48. The supports 50 are all located at the junctions between adjacent segments 34, 52, 60, 78, 80, 82, 84, 86, but need not be in these positions in other embodiments. The supports 50 could touch the various segments 34, 52, 60, 78, 80, 82, 84, 86 or may be free from engagement with them when the tire 10 is within the fixtures 46, 48.

With the damaged tire 10 supported by the fixtures 46, 48, the releasable adhesives 42, 44 of the damaged segment 34 can be activated in order to remove the damaged segment 34 from the non-pneumatic tire 10. FIG. 15 shows the application of heat and the removal of the damaged segment 34. Heat may be applied to the releasable adhesive 42 to remove its adhesive qualities so that the damaged segment outer radial bonding end 38 can be detached from the inner surface of the shear band 16. Heat can also be applied to the releasable adhesive 44 to weaken its adhesive properties to allow the damaged segment inner radial bonding end 40 to be released from the outer surface of the hub 12. The releasable adhesives 42, 44 can be activated by any mechanism and heat exclusively, or heat in combination with some other activation mechanism need not be used in all executions of the method. For example, in some embodiments the releasable adhesives 42, 44 may include ferromagnetic nanoparticles and can adhere the segments to the hub 12 and shear band 16. When removal is desired, the ferromagnetic nanoparticles may be activated by electromagnetic energy in order to cause the releasable adhesives 42, 44 to be activated so that they lose their adhesive properties to allow the damaged segment 34 to be removed from the tire 10. The method includes various embodiments where the releasable adhesive 42, 44 can be activated to cause loss of adhesion in a variety of manners. With respect to heat activation of the releasable adhesives 42, 44 the manner of operation of the non-pneumatic tire 10 causes certain locations of the tire 10 to operate near nominal temperatures allowing more flexibility in the selection of heat activated releasable adhesives 42, 44. The releasable adhesives 42, 44 may be reversible thermoplastic adhesives.

After removal of the damaged segment 34, the cavity in the series of segments 52, 60, 78, 80, 82, 84, 86 can be filled by the insertion of a new, undamaged segment 20. FIG. 16 shows the non-pneumatic tire 10 still within the fixtures 46, 48 with the new, undamaged segment 20 added and secured thereto through the use of adhesives 28 and 30. The adhesives 28, 30 could be permanent adhesive or releasable adhesive so that if the segment 20 becomes damaged it too could be removed and replaced. The segment 20 may be added to the non-pneumatic tire 10 in any manner and bonded in place in order to complete the repair. As such, the present method provides for a way to build a new non-pneumatic tire 10 using a plurality of modular spoke segments 20, and for a way to repair a damaged spoke segment 20 of a non-pneumatic tire 10.

The segment 20 can be composed of any number of spokes 22 in other embodiments, and may extend any arc length about the central axis 14 in the circumferential direction 32. FIG. 17 shows one embodiment in which the segment 20 has 32 spokes 22 and extends 180 degrees about the central axis 14 in the circumferential direction 32. FIG. 18 shows another embodiment where the segment 20 extends 90 degrees about the central axis 14 in the circumferential direction 32 and has 16 spokes 22. The tire 10 could include one segment 20 such as the one shown in FIG. 17, and two segments 20 such as the one shown in FIG. 18 in some embodiments. The segments 20 of the tire 10 need not all have the same number of spokes 22 and need not all be the same size such that they can extend different arc lengths about the central axis 14 in the circumferential direction 32. One or more of the segments 20 can be electrically conductive so that electricity can be discharged from the tire 10 to the ground. Other ones of the segments 20 need not be conductive should discharge be possible through other ones of the segments 20. In some embodiments, the tire 10 includes two segments 20 that each have two spokes 22. These two segments 20 can include conductive rubber to allow for electricity to be discharged from the tire 10. Also in this tire 10, four segments are included that each have fourteen spokes 22 so that a total of 64 spokes 22 are present. These four segments are not electrically conductive.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A method of assembling spokes into a non-pneumatic tire, comprising:
providing a hub, wherein the hub has a central axis;
providing a shear band, wherein the shear band is located outward from the hub in a radial direction;
providing an undamaged segment that has a plurality of undamaged spokes that engage both an undamaged segment outer radial bonding end and an undamaged segment inner radial bonding end, wherein the undamaged segment extends less than 360 degrees about the central axis in a circumferential direction, wherein the undamaged segment is located between the hub and the shear band;
providing a damaged segment that has a plurality of spokes one of which is damaged through use of the non-pneumatic tire, wherein the damaged segment has a damaged segment outer radial bonding end and damaged segment inner radial bonding end, wherein the plurality of spokes of the damaged segment engage both the damaged segment outer radial bonding end and the damaged segment inner radial bonding end, wherein the damaged segment extends less than 360 degrees about the central axis in the circumferential direction, wherein the damaged segment is located immediately adjacent to the undamaged segment in the circumferential direction, wherein the damaged segment inner radial bonding end is attached to the hub, and wherein the damaged segment outer radial bonding end is attached to the shear band;
providing a replacement segment that has a plurality of spokes, wherein the replacement segment has a replacement outer radial bonding end and a replacement inner radial bonding end, wherein the plurality of spokes of the replacement segment engage both the replacement outer radial bonding end and the replacement inner radial bonding end, wherein the plurality of spokes of the replacement segment make up a portion of a first outer exterior side surface of the non-pneumatic tire and extend in an axial direction and make up a second outer exterior side surface of the non-pneumatic tire;

removing the damaged segment from the shear band and the hub while the shear band extends 360 degrees continuously about the central axis in the circumferential direction, and inserting the replacement segment between the hub and the shear band where the damaged segment was removed while the shear band is present and extends 360 degrees continuously about the central axis in the circumferential direction;

attaching the outer radial bonding end of the replacement segment to the shear band, and the inner radial bonding end of the replacement segment to the hub, wherein the attaching uses adhesive, and wherein the replacement segment extends less than 360 degrees about the central axis in the circumferential direction;

wherein a tread is located on and attached to an outer exterior surface of the shear band, wherein the tread is present and extends 360 degrees continuously about the central axis in the circumferential direction during the inserting, the removing, and the attaching.

2. The method as set forth in claim 1, wherein the adhesive that is used to attach the outer radial bonding end of the replacement segment to the shear band is releasable adhesive that can be activated to allow the outer radial bonding end of the replacement segment to release from the shear band; and wherein the adhesive that is used to attach the inner radial bonding end of the replacement segment to the hub is releasable adhesive that can be activated to allow the inner radial bonding end of the replacement segment to release from the hub.

3. The method as set forth in claim 2, wherein the releasable adhesive that is activated to allow the outer radial bonding end of the replacement segment to release from the shear band is activated by heating; and wherein the releasable adhesive that is activated to allow the inner radial bonding end of the replacement segment to release from the hub is activated by heating.

4. A method of assembling spokes into a non-pneumatic tire, comprising:

providing a hub, wherein the hub has a central axis;

providing a shear band, wherein the shear band is located outward from the hub in a radial direction;

providing an undamaged segment that has a plurality of undamaged spokes that engage both an undamaged segment outer radial bonding end and an undamaged segment inner radial bonding end, wherein the undamaged segment extends less than 360 degrees about the central axis in a circumferential direction, wherein the undamaged segment is located between the hub and the shear band;

providing a damaged segment that has a plurality of spokes one of which is damaged through use of the non-pneumatic tire, wherein the damaged segment has a damaged segment outer radial bonding end and damaged segment inner radial bonding end, wherein the plurality of spokes of the damaged segment engage both the damaged segment outer radial bonding end and the damaged segment inner radial bonding end, wherein the damaged segment extends less than 360 degrees about the central axis in the circumferential direction, wherein the damaged segment is located immediately adjacent to the undamaged segment in the circumferential direction, wherein the damaged segment inner radial bonding end is attached to the hub by adhesive, and wherein the damaged segment outer radial bonding end is attached to the shear band by adhesive;

providing a replacement segment that has a plurality of spokes, wherein the replacement segment has a replacement segment outer radial bonding end and a replacement segment inner radial bonding end, wherein the plurality of spokes of the replacement segment engage both the replacement segment outer radial bonding end and the replacement segment inner radial bonding end;

removing the damaged segment from the shear band and the hub while the shear band extends 360 degrees continuously about the central axis in the circumferential direction;

inserting the replacement segment between the hub and the shear band where the damaged segment was removed while the shear band is present and extends 360 degrees continuously about the central axis in the circumferential direction;

attaching the outer radial bonding end of the replacement segment to the shear band, and the inner radial bonding end of the replacement segment to the hub, wherein the attaching uses adhesive, and wherein the replacement segment extends less than 360 degrees about the central axis in the circumferential direction;

wherein the adhesive that is used to attach the damaged segment outer radial bonding end to the shear band is releasable adhesive that can be activated to allow the damaged segment outer radial bonding end to release from the shear band; and wherein the adhesive that is used to attach the damaged segment inner radial bonding end to the hub is releasable adhesive that can be activated to allow the damaged segment inner radial bonding end to release from the hub;

wherein the releasable adhesive that is activated to allow the damaged segment outer radial bonding end to release from the shear band has ferromagnetic nanoparticles and is activated by electromagnetic energy;

wherein the releasable adhesive that is activated to allow the damaged segment inner radial bonding end to release from the hub has ferromagnetic nanoparticles and is activated by electromagnetic energy;

wherein a tread is located on and attached to an outer exterior surface of the shear band, wherein the tread is present and extends 360 degrees continuously about the central axis in the circumferential direction during the inserting, the removing, and the attaching.

5. The method as set forth in claim 1, wherein the damaged segment outer radial bonding end is attached to the shear band by releasable adhesive, and wherein the damaged segment inner radial bonding end is attached to the hub by releasable adhesive, wherein the removing includes heating the releasable adhesive at the damaged segment outer radial bonding end to effect activation to allow the damaged segment outer radial bonding end to be removed, and wherein the removing includes heating the releasable adhesive at the damaged segment inner radial bonding end to effect activation to allow the damaged segment inner radial bonding end to be removed.

6. The method as set forth in claim 2, further comprising placing the hub and the shear band between an inner fixture and an outer fixture, wherein a plurality of supports extend from the inner fixture to the outer fixture, wherein the attaching is executed when the hub and the shear band are located between the inner fixture and the outer fixture.

7. The method as set forth in claim 1, wherein the plurality of spokes of the damaged segment are molded with the damaged segment outer radial bonding end and the damaged segment inner radial bonding end such that the plurality of spokes of the damaged segment are integrally formed with the damaged segment outer radial bonding end and the damaged segment inner radial bonding end.

8. A method of assembling spokes into a non-pneumatic tire, comprising:
   providing a hub, wherein the hub has a central axis;
   providing a shear band, wherein the shear band is located outward from the hub in a radial direction;
   providing a segment that has a plurality of spokes, wherein the segment has an outer radial bonding end and an inner radial bonding end, wherein the plurality of spokes engage both the outer radial bonding end and the inner radial bonding end;
   wherein the segment is a first segment, wherein the outer radial bonding end is a first outer radial bonding end, wherein the inner radial bonding end is a first inner radial bonding end, and wherein the plurality of spokes is a first plurality of spokes;
   wherein a second segment that has a second plurality of spokes is provided and has a second outer radial bonding end and a second inner radial bonding end, wherein the second plurality of spokes engage both the second outer radial bonding end and the second inner radial bonding end;
   wherein a third segment that has a third plurality of spokes is provided and has a third outer radial bonding end and a third inner radial bonding end, wherein the third plurality of spokes engage both the third outer radial bonding end and the third radial inner bonding end;
   wherein the second segment extends less than 360 degrees about the central axis in the circumferential direction, wherein the third segment extends less than 360 degrees about the central axis in the circumferential direction;
   wherein the second outer radial bonding end and the third outer radial bonding end are attached to the shear band, wherein the second inner radial bonding end and the third inner radial bonding end are attached to the hub, wherein the first segment is damaged through use of the non-pneumatic tire and is between the second segment and the third segment in the circumferential direction such that first segment directly faces the second segment, and such that the first segment directly faces the third segment; and
   wherein the first segment is not attached with adhesive to the second segment, and wherein the first segment is not attached with adhesive to the third segment;
   removing the damaged first segment from the shear band and the hub while the shear band extends 360 degrees continuously about the central axis in the circumferential direction, and while the second and third segments are attached to the hub and the shear band;
   inserting a replacement segment between the hub and the shear band where the damaged first segment was removed while the shear band is present and extends 360 degrees continuously about the central axis in the circumferential direction;
   wherein the replacement segment has a plurality of spokes, wherein the replacement segment has a replacement segment outer radial bonding end and a replacement segment inner radial bonding end, wherein the plurality of spokes of the replacement segment engage both the replacement segment outer radial bonding end and the replacement segment inner radial bonding end, wherein the replacement segment extends less than 360 degrees about the central axis in the circumferential direction; and
   attaching the replacement segment outer radial bonding end to the shear band, and the replacement segment inner radial bonding end to the hub, wherein the attaching uses adhesive;
   wherein a tread is located on and attached to an outer exterior surface of the shear band, wherein the tread is present and extends 360 degrees continuously about the central axis in the circumferential direction during the inserting, the removing and the attaching.

9. The method as set forth in claim 1, wherein the replacement segment is molded by a floating mold that has a plurality of base pieces and a plurality of inserts that are detachable from the base pieces, wherein the floating mold has a pair of end pieces.

10. The method as set forth in claim 1, wherein the replacement segment extends 45 degrees about the central axis in the circumferential direction, wherein the number of the plurality of spokes in the replacement segment is eight, and wherein six additional segments each having eight spokes are located between and attached to the hub and the shear band, and wherein the replacement segment, the undamaged segment and the six additional segments combined extend 360 degrees about the central axis in the circumferential direction.

11. The method as set forth in claim 1, wherein the damaged segment outer radial bonding end is made of outer ends of the plurality of spokes of the damaged segment, and wherein the damaged segment inner radial bonding end is made of inner ends of the plurality of spokes of the damaged segment.

12. The method as set forth in claim 1, wherein the replacement segment is electrically conductive such that a conductive path is present from the hub through the replacement inner radial bonding end through at least one spoke of the plurality of spokes of the replacement segment through the replacement outer radial bonding end and through the shear band.

* * * * *